US006040363A

United States Patent [19]
Warner et al.

[11] Patent Number: 6,040,363
[45] Date of Patent: Mar. 21, 2000

[54] METATHESIS POLYMERIZERED OLEFIN COMPOSITES INCLUDING SIZED REINFORCEMENT MATERIAL

[75] Inventors: Mark W. Warner, Benton; Steven D. Drake, Sherwood, both of Ark.; Michael A. Giardello, Pasadena, Calif.

[73] Assignee: A. O. Smith Corporation, Milwaukee, Wis.

[21] Appl. No.: 09/148,459

[22] Filed: Sep. 4, 1998

Related U.S. Application Data

[60] Provisional application No. 60/057,999, Sep. 5, 1997.

[51] Int. Cl.[7] .................. C08K 9/06; C08K 3/40
[52] U.S. Cl. .................. 523/214; 523/210; 523/212; 524/494
[58] Field of Search .................. 523/210, 212, 523/214; 524/494

[56] References Cited

U.S. PATENT DOCUMENTS

| | | | |
|---|---|---|---|
| 3,968,068 | 7/1976 | Haggerty | 260/29.6 RB |
| 4,246,367 | 1/1981 | Curtis, Jr. | 525/49 |
| 4,251,576 | 2/1981 | Osborn et al. | 428/331 |
| 4,289,672 | 9/1981 | Friederich et al. | 260/29.2 TN |
| 4,301,306 | 11/1981 | Layer | 568/734 |
| 4,324,717 | 4/1982 | Layer | 524/244 |
| 4,380,617 | 4/1983 | Minchak et al. | 526/161 |
| 4,598,102 | 7/1986 | Leach | 521/93 |
| 4,661,575 | 4/1987 | Tom | 526/283 |
| 4,708,969 | 11/1987 | Leach | 521/82 |
| 4,716,080 | 12/1987 | Lewin | 428/389 |
| 4,748,216 | 5/1988 | Tom | 526/77 |
| 4,902,560 | 2/1990 | Silver | 428/273 |
| 4,943,621 | 7/1990 | Janda et al. | 526/127 |
| 5,034,276 | 7/1991 | Zwiersch et al. | 428/391 |
| 5,063,103 | 11/1991 | Sugawara et al. | 428/285 |
| 5,266,370 | 11/1993 | Woodson et al. | 428/36.92 |
| 5,266,665 | 11/1993 | Hardiman | 526/117 |
| 5,296,566 | 3/1994 | Brown-Wensley et al. | 526/171 |
| 5,312,940 | 5/1994 | Grubbs et al. | 556/136 |
| 5,319,014 | 6/1994 | Moorman et al. | 524/427 |
| 5,342,909 | 8/1994 | Grubbs et al. | 526/171 |
| 5,369,195 | 11/1994 | Kelsey | 526/119 |
| 5,378,783 | 1/1995 | Okumura et al. | 526/283 |
| 5,480,940 | 1/1996 | Khasat et al. | 525/290 |
| 5,539,060 | 7/1996 | Tsunogae et al. | 525/338 |
| 5,776,997 | 7/1998 | Hafner et al. | 522/65 |
| 5,821,278 | 10/1998 | Van Der Schaaf et al. | 522/66 |

FOREIGN PATENT DOCUMENTS

WO 97/20865  6/1997  WIPO .................. C08F 4/80

OTHER PUBLICATIONS

Nguyen, et al., "Ring-Opening Metathesis Polymerization (ROMP) of Norbornene by a Group VIII Carbene Complex in Protic Media", J. Am. Chem. Soc., 114, p. 3974–3975, 1992.

Goodrich, "Non-Reinforced Plastic Combines Strength with Chemical Resistance", Chemical Engineering, p. 153, Jul. 1996.

Novak, et al., "Catalytic Organometallic Chemistry in Water: The Aqueous Ring-Opening Metathesis Polymerization of 7–Oxanorbornene Derivatives", J. Am. Chem. Soc., 110, p. 7542–7543, 1988.

Novak, et al., "The Ring Opening Metathesis Polymerization of 7–Oxabicyclo[2.2.1]hept–5–ene Derivatives: A New Acyclic Polymeric Ionophore", J. am. Chem. Soc., 110, p. 960–961, 1988.

*Primary Examiner*—Edward J. Cain
*Attorney, Agent, or Firm*—Michael Best & Friedrich LLP

[57] ABSTRACT

A reinforced polyolefin article is provided which includes a sized reinforcement material incorporated in the article. The article may be prepared by polymerizing a cyclic olefin monomer in the presence of the sizing agent and a metathesis polymerization catalyst which includes ruthenium or osmium.

21 Claims, No Drawings

METATHESIS POLYMERIZERED OLEFIN COMPOSITES INCLUDING SIZED REINFORCEMENT MATERIAL

RELATED APPLICATION

This application claims the benefit under 35 U.S.C. §119 of U.S. Provisional Patent Application Ser. No. 60/057,999 filed Sep. 5, 1997 now abandoned.

FIELD OF THE INVENTION

The present invention relates to articles made of reinforced metathesis polymerized olefins and cycloolefins, incorporating reinforcing materials, and methods for producing the same. More particularly, the invention relates to reinforced metathesis polymerized olefins and cycloolefins that are polymerized in the presence of a reinforcing material coated with a coupling or sizing agent.

BACKGROUND PRIOR ART

Numerous polymers of olefins, especially polymers of cycloolefins, produced through metathesis polymerization reactions using a metathesis catalyst are technologically and commercially important materials. Especially important are polymers of cycloolefins that are produced through Ring Opening Metathesis Polymerization (ROMP) reactions. Many such materials are tough and rigid, and have excellent chemical resistance. However, for many high performance applications, even higher stiffness and strength are desirable. In such applications, it is desirable to provide for reinforcement of the polyolefin structure.

Fiber reinforced polymer structures, generally, are known in the polymer art. Fiber reinforcement of polymers such as poly-dicyclopentadiene or other polymers of strained ring cycloolefins has been taught by Leach in U.S. Pat. No. 4,708,969. Improving the physical properties of a glass composite polydicyclopentadiene by heat treatment is taught by Silver in U.S. Pat. No. 4,902,560. A reinforced norbornene polymer matrix including a glass mat reinforcement is taught by Sugawara et al. in U.S. Pat. No. 5,063,103.

However, it has been a problem to provide for a good interface or good adhesion between the reinforcement materials and polyolefins produced through metathesis polymerization reactions. Due to the poor interface between the reinforcement material and the polyolefin, stiffness and strength are lost. Additionally, if such composite materials are exposed to fluids during use, the fluids "wick" along the surface of the reinforcement material, due to the poor adhesion, and eventually wet the entire reinforcement material. The presence of a fluid further adversely affects the adherence of the polyolefin to the reinforcement material, and causes further loss of stiffness and strength. The wicking can cause the resulting composite material to be permeable to liquid, making it not feasible for use with liquids.

Coupling agents, also referred to as sizing agents, are generally known in the polymer art to improve adhesion between reinforcement materials and polymer matrixes. However, it is known that coupling agents, and other impurities, adversely affect traditional metathesis catalysts, and are not usable with such catalysts. Silver U.S. Pat. No. 4,902,560, specifically teaches that in dealing with a metathesis produced reinforced polymer matrix, the reinforcing agent should be "substantially completely free of surface coatings" and that "physical properties of structures prepared with glass containing surface treatments such as, e.g., coupling or sizing agents, deteriorate upon post-cure . . ." See U.S. Pat. No. 4,902,560, Column 3, Lines 51–58.

Sugawara, et al. U.S. Pat. No. 5,063,103, teaches a method of coating a sized glass reinforcement mat with a hydrocarbon. A norbornene polymer is then polymerized with a metathesis catalyst system in the presence of the hydrocarbon coated glass mat to form a reinforced polymer structure. However, the metathesis catalyst never comes into contact with the sizing agent. The hydrocarbon binder layer covers the sizing agent such that it does not adversely affect the metathesis catalyst. The additional step of coating the sized glass mat prior to exposing it to the catalyst is expensive, time consuming, and burdensome.

It is desirable to provide a reinforced composite of a metathesis polymerized olefin polymer, especially a ROMP reaction polymerized cycloolefin polymer, and a process for making the same, wherein the polymer is polymerized with a metathesis catalyst in the presence of a reinforcing material having a coupling agent thereon, and the coupling agent provides for an improved interface between the polymer and the reinforcing material without significantly adversely affecting the polymerization reaction.

SUMMARY OF THE INVENTION

The present invention addresses these needs by using coupling agents which render a reinforcing material more compatible for a better interface with an olefin polymer that is polymerized through a metathesis polymerization reaction, but do not adversely poison or otherwise adversely affect the metathesis catalyst or the polymerization reaction.

More particularly, a ruthenium or osmium carbene complex catalyst is used as the catalyst for the metathesis polymerization of olefin monomers, and the polymerization reaction takes place with the catalyst/monomer mixture in direct contact with a reinforcement material coated with a suitable coupling agent, and the coupling agent has minimal poisoning or other adverse affect on the catalyst.

Other features and advantages of the invention will become apparent to those skilled in the art upon review of the following detailed description and claims.

Before embodiments of the invention are explained in detail, it is to be understood that the invention is not limited in its application to the details of the composition and concentration of components set forth in the following description. The invention is capable of other embodiments and of being practiced or being carried out in various ways. Also, it is understood that the phraseology and terminology used herein is for the purpose of description and should not be regarded as limiting.

DETAILED DESCRIPTION OF AN EMBODIMENT

The invention involves polymerization of olefins through olefin metathesis reactions, especially Ring Opening Metathesis Polymerization (ROMP) reactions, with a ruthenium or osmium carbene complex metathesis catalyst in the presence of a reinforcing material coated, or sized, with a coupling agent to produce polyolefinic composite materials incorporating the sized reinforcement material. The coupling agent provides for better adhesion between the reinforcement material and the polyolefin.

Suitable ruthenium and osmium carbene complex catalysts, the methods of synthesizing such catalysts, and suitable olefin monomers as well as the methods for performing and controlling the polymerization reaction, are disclosed in the following patents and patent application, all of which are incorporated herein by reference: U.S. Pat. Nos. 5,312,940 and 5,342,909; WO 97/20865.

Catalysts:

Generally suitable catalysts are ruthenium and osmium carbene complex catalysts disclosed in the above cited references.

The preferred ruthenium and osmium carbene complex catalysts include those which are stable in the presence of a variety of functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen. When the catalysts are stable in the presence of these groups, the starting monomers, impurities in the monomer, the coupling agents, any substituent groups on the catalyst, and other additives may include one or more of the above listed groups without deactivating the catalysts.

The catalyst preferably includes a ruthenium or osmium metal center that is in a +2 oxidation state, has an electron count of 16, and is pentacoordinated. These ruthenium or osmium carbene complex catalysts may be represented by the formula:

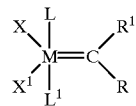

where:

M is Os or Ru;

R and $R^1$ may be the same or different and may be hydrogen or a substituent group which may be $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, the substituent group may be substituted with one or more groups selected from $C_1$–$C_5$ alkyl, halide, $C_1$–$C_5$ alkoxy, and phenyl. The phenyl group may optionally be substituted with one or more groups selected from halide, $C_1$–$C_5$ alkyl, and $C_1$–$C_5$ alkoxy. Optionally, the substituent group may be substituted with one or more functional groups selected from hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen. In a preferred embodiment, R and $R^1$ are the same or different and may be hydrogen, substituted aryl, unsubstituted aryl, substituted vinyl, and unsubstituted vinyl; where the substituted aryl and substituted vinyl are each substituted with one or more groups selected from hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen, $C_1$–$C_5$ alkyl, $C_1$–$C_5$ alkoxy, unsubstituted phenyl, and phenyl substituted with halide, $C_1$–$C_5$ alkyl or $C_1$–$C_5$ alkoxy;

X and $X^1$ may be the same or different and may generally be hydrogen or any anionic ligand. An anionic ligand is any ligand which when removed from a metal center in its closed shell electron configuration has a negative charge. In a preferred embodiment, X and $X^1$ are the same or different and may be halogen, hydrogen or a substituent group selected from $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, aryl or $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl. The substituent groups may optionally be substituted with $C_1$–$C_5$ alkyl, halogen, $C_1$–$C_5$ akloxy or phenyl. The phenyl may be optionally substituted with halogen, $C_1$–$C_5$ alkyl, or $C_1$–$C_5$ alkoxy. In a more preferred embodiment, X and $X^1$ are the same or different and may be Cl, Br, I, H or a substituent group selected from benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. The substituent groups may be optionally substituted with $C_1$–$C_5$ alkyl or a phenyl group. The phenyl group may optionally be substituted with halogen, $C_1$–$C_5$ alkyl or $C_1$–$C_5$ alkoxy. In an even more preferred embodiment, X and $X^1$ are the same or different and are selected from Cl, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate. In the most preferred embodiment, X and $X^1$ are both Cl; and L and $L^1$ may be the same or different and may be generally be any neutral electron donor. A neutral electron donor is any ligand which, when removed from a metal center in its closed shell electron configuration, has a neutral charge. In a preferred embodiment, L and $L^1$ may be the same or different and may be phosphines, sulfonated phosphines, phosphites, phosphinites, phosphonites, arsines, stibines, ethers, amines, amides, sulfoxides, carboxyls, nitrosyls, pyridines, and thioethers. In a more preferred embodiment, L and $L^1$ are the same or different and are phosphines of the formula $PR^3R^4R^5$ where $R^3$ is a secondary alkyl or cycloaklyl and $R^4$ and $R^5$ are the same or different and are aryl, $C_1$–$C_{10}$ primary alkyl, secondary alkyl, or cycloaklyl. In the most preferred embodiment, L and $L^1$ are the same or different and are —P(cyclohexyl)$_3$, —P(cyclopentyl)$_3$, or —P(isopropyl)$_3$. L and $L^1$ may also be —P(phenyl)$_3$.

A preferred group of catalysts are those where M is Ru; $R^1$ and R are independently hydrogen or substituted or unsubstituted aryl or substituted or unsubstituted vinyl; X and $X^1$ are Cl; and L and $L^1$ are triphenylphosphines or trialkylphosphines such as tricyclopentylphosphine, tricyclohexylphosphine, and triisopropylphosphine. The substituted aryl and substituted vinyl may each be substituted with one or more groups including $C_1$–$C_5$ alkyl, halide, $C_1$–$C_5$ alkoxy, and a phenyl group which may be optionally substituted with one or more halide, $C_1$–$C_5$ alkyl, or $C_1$–$C_5$ alkoxy groups. The substituted aryl and substituted vinyl may also be substituted with one or more functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen.

Particularly preferred catalysts can be represented by the formulas:

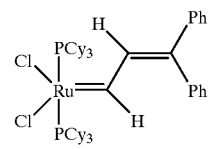

-continued

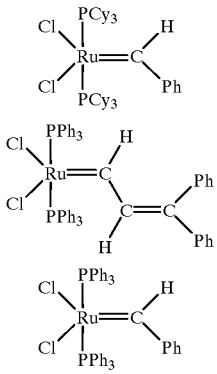

where Cy is cyclopentyl or cyclohexyl, and Ph is phenyl.

The most preferred catalysts can be represented by the formula:

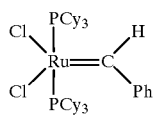

where Cy is cyclopentyl or cyclohexyl, and Ph is phenyl.

The catalysts described above are useful in polymerization of a wide variety of olefin monomers through metathesis polymerization, particularly ROMP of cycloolefins.

Monomers:

Suitable monomers include olefins that can be polymerized by any of the ruthenium or osmium metathesis polymerization catalysts that were discussed above.

The olefin monomers may be unfunctionalized or functionalized to contain one or more functional groups selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen. The olefin may be a strained cyclic olefin, or unstrained cyclic olefin, each of which may be functionalized or unfunctionalized.

Preferred monomers include functionalized or unfunctionalized cyclic olefins that are polymerized through ROMP reactions. This polymerization process includes contacting a functionalized or unfunctionalized cyclic olefin with a ruthenium or osmium metathesis catalysts discussed above. The cyclic olefins may be strained or unstrained and may be monocyclic, bicyclic, or multicyclic olefins. If the cyclic olefin is functionalized, it may contain one or more functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen.

Suitable cyclic olefin monomers include monomers disclosed in U.S. Pat. No. 4,943,621 to Janda, et al., U.S. Pat. No. 4,324,717 to Layer, and U.S. Pat. No. 4,301,306 to Layer, all of which are herein incorporated by reference.

Suitable cyclic olefin monomers include norbornene-type monomers which are characterized by the presence of at least one norbornene group which can be substituted or unsubstituted. Suitable norbornene type monomers include substituted norbornenes and unsubstituted norbornene, dicyclopentadiene, di(methyl) dicyclopentadiene, dihydrodicyclopentadiene, cyclopentadiene trimers, tetramers of cyclopentadiene, tetracyclododecene, and substituted tetracyclododecenes. Common norbornene-type monomers can be represented by the following formulas:

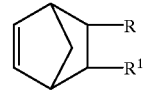

wherein R and $R^1$ may be the same or different and may be hydrogen or a substitute group which may be a halogen, $C_1$–$C_{12}$ alkyl groups, $C_2$–$C_{12}$ alkylene groups, $C_6$–$C_{12}$ cycloalkyl groups, $C_6$–$C_{12}$ cycloalkylene groups, and $C_6$–$C_{12}$ aryl groups or R and $R^1$ together form saturated or unsaturated cyclic groups of from 4 to 12 carbon atoms with the two ring carbon atoms connected thereto, said ring carbon atoms forming part of and contributing to the 4 to 12 carbon atoms in the cyclic group.

Less common norbornene type monomers of the following formulas are also suitable:

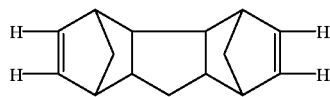

wherein R and $R^1$ have the same meaning as indicated above and n is greater than 1. For example, cyclopentadiene tetramers (n=2), cyclopentadiene pentamers (n=3) and hexacyclopentadecene (n=2) are suitable monomers for use in this invention.

Other specific examples of monomers suitable for use in this invention include:
ethylidenenorbornene,
methyltetracyclododecene,
methylnorbornene,
ethylnorbornene,
dimethylnorbornene and similar derivatives,
norbornadiene,
cyclopentene,
cycloheptene,
cyclooctene,
7-oxanorbornene,
7-oxanorbornene derivatives,
7-oxabicyclo[2.2.1]hept-5ene derivatives,
7-oxanorbornadiene,
cyclododecene,
2-norbornene, also named bicyclo[2.2.1]-2-heptene and substituted bicyclic norbornenes,
5-methyl-2-norbornene,
5,6-dimethyl-2-norbornene,
5-ethyl-2-norbornene,
5-butyl-2-norbornene,
5-hexyl-2-norbornene,
5-octyl-2-norbornene,
5-dodecyl-2-norbornene,
5-isobutyl-2-norbornene,
5-octadecyl-2-norbornene, 5-isopropyl-2-norbornene,
5-phenyl-2-norbornene,
5-p-toluyl-2-norbornene,
5-a-naphthyl-2-norbornene,
5-cyclohexyl-2-norbornene,
5,5-dimethyl-2-norbornene,
dicyclopentadiene (or cyclopentadiene dimer),
dihydrodicyclopentadiene (or cyclopentene cyclopentadiene codimer),
methyl-cyclopentadiene dimer,
ethyl-cyclopentadiene dimer,
tetracyclododecene, also named 1,2,3,4,4a,5,8,8a-octahydro-1,4:5,8-dimethyanonaphthalene
9-methyl-tetracyclo[$6.2.1.1^{3,6}.0^{2,7}$]-4-dodecene, also named 1,2,3,4,4a,5,8,8a-octahydro-2-methyl-4,4:5,8-dimethanonaphthalene
9-ethyl-tetracyclo[$6.2.1.1^{3,6}.0^{2,7}$]-4-dodecene,
9-propyl-tetracyclo[$6.2.1.1^{3,6}.0^{2,7}$]-4-dodecene,
9-hexyl-tetracyclo[$6.2.1.1^{3,6}.0^{2,7}$]-4-dodecene,
9-decyl-tetracyclo[$6.2.1.1^{3,6}.0^{2,7}$]-4-dodecene,
9,10-dimethyl-tetracyclo[$6.2.1.1^{3,6}.0^{2,7}$]-4-dodecene,
9-ethyl, 10-methyl-tetracyclo[$6.2.1.1^{3,6}.0^{2,7}$]-4-dodecene,
9-cyclohexyl-tetracyclo[$6.2.1.1^{3,6}.0^{2,7}$]-4-dodecene,
9-chloro-tetracyclo[$6.2.1.1^{3,6}.0^{2,7}$]-4-dodecene,
9-bromo-tetracyclo[$6.2.1.1^{3,6}.0^{2,7}$]-4-dodecene,
cyclopentadiene-trimer,
methyl-cyclopentadiene-trimer,
and the like.

In a preferred embodiment, the cyclic olefin is cyclobutene, dimethyl dicyclopentadiene, cyclopentene, cycloheptene, cyclooctene, cyclononene, cyclodecene, cyclooctadiene, cyclononadiene, cyclododecene, norbornene, norbornadiene, 7-oxanorbornene, 7-oxanorbornadiene, and dicyclopentadiene; each of which may be functionalized or unfunctionalized. In a more preferred embodiment, the cyclic olefin is dicyclopentadiene. Suitable dicyclopentadiene is commercially available, for example, from Lyondell under the trademarks Lyondell 108 and Lyondoll 103. Preferably, the olefin monomer has a purity greater than about 95 percent by weight.

This invention contemplates preparation of homopolymers, as well as random and block copolymers and terpolymers of the suitable monomers discussed above.

Reinforcement Materials:

Suitable reinforcing materials include those that add to the strength or stiffness of the polymer composite when incorporated with the polymer. Reinforcing material can be in the form of filaments, fibers, rovings, mats, weaves, fabrics, knitted material, cloth or other known structures. Preferably, the reinforcing material is in filament or fiber form or fibers that are knitted into a fabric.

Representative suitable reinforcement materials include barium sulfate; minerals, such as glass, carbon, graphite, ceramic, boron, and the like; metallic materials; organic polymers, such as aromatic polyamides including the aramid fibers, such as Kevlar®, and polybenzimide, polybenzoxazol, polybenzothiazol, polyesters, and the like; polyolefins; fluoropolymer, such as Halar®; cellulosic materials; and other material known to be useful as reinforcing material for polymer systems. Examples of other commercially available reinforcing materials include the following products: Fiberfrax® from Unifrax Corporation, Interfil® from Akzo Nobel, and wollastonite from Nyco. Fiber glass or fiber glass knitted into a fabric are preferred.

Coupling/Sizing Agents:

The reinforcing materials are "sized", i.e., treated or coated with a coupling agent, often also referred to as a sizing or bonding agent, to render them more compatible for adhering with the olefin polymer matrix. As used herein, "coupling agent" means any material that can be applied to a reinforcing material that provides for an improved interface or adhesion between the reinforcement materials and the polyolefin.

"Compatable coupling agents" as used herein include those coupling agents that are capable of being used in the presence of the metathesis polymerization reactions, preferably Ring Opening Metathesis Polymerization (ROMP) reactions, which are catalyzed with a ruthenium or osmium catalyst, without adversely affecting the catalyst or the polymerization reaction. Compatable coupling agents include conventional coupling agents which do not include functional groups that will poison or adversely effect the metathesis polymerization reaction or catalyst.

Compatable coupling agents include a variety of conventional chromium; silane; titanate; zirconate, zirco-aluminate, and hydroxyl terminated amphaphilic coupling agents. Preferably, those which do not contain the following functionalities: vinyl ethers; active oxygen functionalities such as hydroperoxides or activated epoxides; acetylenes; and other Lewis bases that may poison or adversely affect the ruthenium or osmium catalyst.

In a more preferable embodiment, the coupling agents also do not include thiols, primary amines, terminal epoxides, and certain conjugated diene functionalities. However, in certain of these embodiments, where the coupling agent is applied to the reinforcing material in an acidic environment, coupling agents having thiols, primary amines, terminal epoxides, and certain conjugated diene functionalities may be used.

In an even more preferable embodiment, the coupling agent does not include any of the following functionalities: vinyl ethers; active oxygen functionalities such as hydroperoxides and activated epoxides; terminal epoxides; thiols; acetylenes; certain conjugated dienes; amines and other Lewis bases that may poison or adversely affect the ruthenium or osmium catalysts.

Preferable chromium coupling agents include chromium complexes such as methacrylatochromic chloride complex, and other similar such complexes that may contain larger alkyl groups, for example, ethacrylatochromic complexes, propacrylatochromic complexes, butacrylatochromic complexes, etc. The most preferred coupling agents include the methacrylatochromic chloride complex. Such methacrylatochromic chloride complex coupling agents are commercially available from Du Pont under the trademark Volan®, Volan A®, or Volan L®.

Preferable silane coupling agents include the following chemicals listed below, which are commercially available from Degussa under the corresponding Degussa Designation Number listed below:

| Chemical Name | Degussa Desig. No. |
| --- | --- |
| Propyltrimethoxysilana | Si103 |
| Octyltrimethoxysilane | Si108 |
| Octadecyltrimathoxysilane | Si118 |
| Vinyltris(2-methoxyethoxy)silane | Si210 |
| 3-Butenyltriethoxysilane | Si221 |
| 2-(3-Cyclonexenyl)ethyltriethoxysilane | Si222 |
| 3-Methacryloxypropyltriethoxysilane | Si223 |
| 3-Chloropropyltriethoxysilane | Si230 |
| 3,4-Dichlorobutyltriethoxysilane | Si233 |

-continued

| Chemical Name | Degussa Desig. No. |
| --- | --- |
| N-(3-Triethoxysilylpropylcarbarnoyl) | Si254 |
| Bis(3-trimethoxysilylpropyl)monosulphane | Si165 |
| Bis(3-trimethoxysilylpropyl)tetrasulphane | Si167 |
| Bis(3-triethoxysilylpropyl)tetrasulphane | Si69 |
| (3-Triethoxysilylpropyl)tri-methylammoniumchloride[5]) | Si270 |
| (3-Triethoxysilylpropyl-dimethyloctadecylammoniumchloride[5]) | Si275 |

Other preferable silane coupling agents include the following chemicals listed below, which are commercially available from Dow Corning under the corresponding Dow Corning Designation Number listed below:

| Chemical Name | Dow Corning Desig. No. |
| --- | --- |
| 3-(2-Aminoethylamino)-propyltrimethoxysilane | Z-6020 |
| 3-Chloropropyltrimethoxysilane | Z-6076 |
| Dimethyldichlorosilane | Z-1219 |
| Diphenyldichlorosilane | Z-1223 |
| Hexamethyldisilazane, commercial | Z-6079 |
| g-Methacryloxypropyltrimethoxysilane | Z-6030 |
| Methyltrichlorosilane | Z-1211 |
| Methyltrimethoxysilane | Z-6070 |
| Phenyltrichlorosilane | Z-1216 |
| Vinyltriacetoxysilane | Z-6075 |
| Water Repellent(Proprietary) | 772 |

Other preferable silane coupling agents include the following chemicals listed below, which are commercially available from Union Carbide under the corresponding Union Carbide Designation Number listed below:

| Chemical Name | Union Carbide Desig. No. |
| --- | --- |
| Octyltriethoxysilane | A-137 |
| Methyltriethoxysilane | A-162 |
| Methyltrimethoxysilane | A-163 |
| Proprietary non-ionic silane dispersing agent | A-1230 |
| Vinyltriethoxysilane | A-151 |
| Vinyltrimethoxysilane | A-171 |
| Vinyl-tris(2-methoxyethoxysilane) | A-172 |
| gamma-Methacryloxypropyltrimethoxysilane | A-174 |
| beta-(3,4-Epoxycyclohexyl)ethyltrimethoxysilane | A-186 |
| gamma-Mercaptopropyltrimethoxysilane | A-189 |
| Polyazamide silane (50% in methanol) | A-1387 |
| gamma-ureidopropyltrialkoxysilane (50% in methanol) | A-1160 |
| gamma-isocyanatopropyltriethoxycilane | A-1310 |

Suitable titanate coupling agents are commercially available from Dupont under the trademark Tyzor. Suitable zirconate coupling agents are commercially available from Kenrich under the Trademark Ken-react, and suitable zircoaluminate coupling agents are commercially available from Rhone-Poulenc.

Suitable hydroxyl terminated amphaphilic coupling agents include the following which are commercially available from Chartwell:

| Trademark | Functionality |
| --- | --- |
| B-525 | carboxy |
| B-525.1 | carboxy |
| B-535.1 | $C_{12}$–$C_{18}$ |
| B-600 | sulfido |

The coupling agent is applied to the reinforcing material prior to the polymerization reaction wherein the reinforcing material is incorporated into the polyolefin article. Suitable methods for applying the coupling agent include dipping, spraying, brushing, rolling or other methods known in the art for applying a coupling agent to a reinforcing material. The coupling agent is applied to the reinforcing material to provide at least a partial coating and in an amount such that the coupling agent improves the interface or adhesion between the reinforcing materials and the polyolefin.

Methods for Making Reinforced Articles:

The reinforced polyolefin composite articles are made using methods such that the metathesis polymerization of the monomer occurs in the presence of the sized reinforcing materials. Suitable methods of making the reinforced articles include a variety of polymer processing techniques, such as: casting, centrifugal casting, pultrusion, molding, rotational molding, open molding, reaction injection molding (RIM), resin transfer molding (RTM), pouring, vacuum impregnation, surface coating, filament winding and other methods known to be useful for producing reinforced polymer articles. Preferably, the reinforced polymer structures are manufactured through centrifugal casting or filament winding.

The polymerization reaction is carried out within or on the casts, cast tubes, molds, mandrels or other structures used in the above named methods, in the presence of the sized reinforcing material to create reinforced metathesis polymerized polymer articles.

Reaction and Processing Conditions:

The parameters for the metathesis polymerization reactions used in the current invention, such as the atmosphere, the ratio of catalyst to monomer, the reaction temperatures, the solvents that may be used, the additives and other agents that may be present during the polymerization reaction, and the methods for carrying out the metathesis polymerization are disclosed in the incorporated references identified above.

Generally the polymerization of the olefin is carried out by adding the desired ruthenium or osmium carbene metathesis catalyst to the monomer starting material which has been heated to a starting resin temperature. Alternatively, the catalyst may be first added to the monomer starting material and the mixture then heated to the required temperature. The starting resin temperature is not critical; but, as is known, this temperature does affect the rate of the polymerization reaction. Generally the reaction temperature will be in the range of about 0° C. to about 100° C., and preferably about 25° C. to about 45° C.

The ratio of catalyst to starting material is not critical and can within the range from about 1:5 to about 1:200,000 by mole. Ratios of catalyst to starting material of between about 1:2,000 and 1:15,000 by mole are preferred. The invention may be practiced using catalyst/starting material ratios outside of the above ranges.

The monomer starting material may optionally be refluxed, run through absorption purification, and degassed before the catalyst is added; although, none of these procedures is necessary to practice the invention.

If a gel modification additive, cross-linking agent, or other additive is used it is preferred that the additives be added before the catalyst; although, this is not critical.

Although it is preferred that the reaction be conducted in the absence of a solvent this is not critical. Possible solvents that may be used include organic, protic, or aqueous solvents which are inert under the reaction conditions. Examples of suitable solvents may include aromatic hydrocarbons, chlorinated hydrocarbons, ethers, alipahtic hydrocarbons, alcohols, water, or mixtures thereof.

After polymerization is complete (i.e., after the article has "cured") the polyolefin article may be post cured to initiate increased cross-linking. As is known, additional cross-linking may be accomplished by post-curing at an elevated temperature. As is well known in the art, other methods may be used to post-cure the polyolefin material.

Unlike previous catalyst systems, the catalyst/monomer starting material mixture employed by the present invention may remain liquid for a considerable period of time depending on the temperature and the amount of gel modification additive present. This characteristic of the present catalyst system allows polyolefin articles to be made using a variety of polymer processing techniques discussed above.

The monomer starting material may also include a flame-retarding agent to reduce the flammability of the polyolefin. The flame-retarding agent must be capable of being used in the presence of the metathesis polymerization reactions catalyzed with a ruthenium or osmium catalyst, without adversely affecting the catalyst or the polymerization reaction. Suitable flame-retarding agents include conventional flame-retarding agents which do not include functional groups that will poison or adversely effect the metathesis polymerization reaction or catalyst. Such flame retardants are commercially available from Clariant under the trademarks EXOLIT IFR-11 and EXOLIT IFR-10.

The monomer starting material may optionally include additives such as fillers, binders, plasticizers, pigments, dyes, etc., as is known in the art. However, because of the functional group tolerance of the catalysts, additives which cannot be used with other catalyst systems in the preparation of metathesis polymerized articles can be used.

The following examples are intended to exemplify embodiments of the invention and are not to be construed as limitations thereof.

EXAMPLE

A two inch diameter reinforced polydicyclopentadiene (PolyDCPD) pipe was produced using a centrifugal casting method. A fiberglass fabric was used as the reinforcing material. The fiberglass fabric was sized with a methacrylatochromic chloride complex coupling agent purchased from Du Pont under the trademark "Volan". The following components were mixed to make the DCPD resin/catalyst mixture:

| Ingredient | Parts Per Hundred Resin |
| --- | --- |
| DCPD Monomer | 100 |
| Catalyst* | 0.083 |
| Triphenyl phosphine | 0.0938 |
| EXOLIT IFR-11 or 10 | 11.11 |
| Ciba-Geigy Tinuvin 123 | 0.10 |
| Albermarle Ethanox 702 | 4.0 |
| TOTAL | 115.387 |

* bis-(tricyclohexylphosphine)-benzylidine ruthenium dichloride

The following process steps were then used to produce the pipe:

1. The Volan Sized Fiberglass Fabric was rolled around a tube (mandrel) smaller than the inside diameter of the desired finished pipe. The number of layers and weight of the fabric may vary with the diameter and pressure rating of the finished pipe.
2. The fabric and tube were inserted into the mold tube, and the tube was spun at a high enough revolutions per minute (RPM) to "unwind" the fabric from the mandrel.
3. After the mandrel was withdrawn, plugs were inserted into each end of the mold tube. One of the plugs included a port which could be sealed after injecting the resin/catalyst mixture into the tube through the port.
4. A premeasured amount of the above resin/catalyst mixture formulation was injected into the tube through the port in the end plug. The amount of resin depends upon the desired wall thickness and diameter of the finished pipe.
5. The tube was spun at a speed which will result in approximately 75 G's of force on the outside of the mold tube. A temperature of 85–95° F. was maintained by keeping the temperature of the room in which the pipe was produced at this temperature. This insured that the mold, glass and resin are all the same temperature.
6. The tube was allowed to spin until the mixture gelled, which was for approximately 30 minutes (the resin exothermed and gelled during this time).
7. The mold tube and pipe were removed from the spinning machine and placed in a post cure oven for 30 minutes at 300° F.
8. The pipe was removed from the mold tube, the ends of the pipe were trimmed, and the mold tube was recycled.

Upon removal of the pipe, no significant odor of DCPD was noticed, indicating minimal amounts of residual monomer after curing.

End caps were then adhesively bonded onto each end of the sized pipe so that a hydrostatic pressure test could be performed. The hydrostatic pressure test was performed in accordance with ASTM procedure D1599. The sized pipe was pressurized up to about 1500 pounds per square inch (psi) before failing by actually tearing the fiberglass fabric. There was no weepage up to this point, indicating that the pipe was substantially impermeable, and there was no pathway for leakage along any unreacted monomer.

In a second test, the sized pipes had a liquid red dye applied to the end of the pipe. The pipe made with the Volan sized fabric did not exhibit any red dye penetration or "wicking", even after several hours.

COMPARATIVE EXAMPLE

In a comparative example, a control sample of two inch diameter reinforced PolyDCPD pipe was produced in the same manner described in Example 1, except that the fiberglass fabric was sized with an amino silane coupling agent.

Upon removal of the pipe after curing, heavy odor of DCPD was noticed, indicating unreacted DCPD monomer.

End caps were then adhesively bonded onto each end of the pipe so that a hydrostatic pressure test could be performed in accordance with ASTM procedure D1599. At the city water pressure of approximately 80 psi, general weepage through the wall of the pipe was noted. It was later determined that the water was being forced into the woven roving through the ends of the pipe, and out the woven roving due to the incompatible finish on the woven roving deactivating the catalyst at the interface between the polymer and the reinforcing material.

In the second test, the amino-silane sized pipe had a liquid red dye applied to the end of the pipe. The pipe made with standard amino-silave sized woven roving "wicked" the red dye at least ½ inch along the reinforcing glass fibers within a few minutes.

We claim:

1. A reinforced polyolefin article comprising:
   a) a reinforcing material at least partially coated with a compatible coupling agent other than a functionalized silane having a primary amine functional group or a functionalized silane having a terminal epoxide functional group; and
   b) a polyolefin prepared by polymerizing an olefin monomer in the presence of the coupling agent and a metathesis polymerization catalyst which comprises a ruthenium carbene complex catalyst or an osmium carbene complex catalyst, whereby the coupling agent is disposed between the reinforcing material and the polyolefin.

2. The reinforced polyolefin article of claim 1 wherein the olefin monomer comprises a cyclic olefin.

3. The reinforced polyolefin article of claim 2 wherein the olefin monomer comprises a norbornene-type monomer.

4. The reinforced polyolefin article of claim 2 wherein the olefin monomer comprises dicyclopentadiene.

5. The reinforced polyolefin article of claim 2 wherein the metathesis polymerization catalyst is of formula:

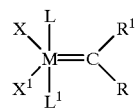

where:
  M is Os or Ru;
  R and $R^1$ are independently selected from hydrogen, or a substituent group selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, each substituent group optionally substituted with one or more groups selected from $C_1$–$C_5$ alkyl, halide, $C_1$–$C_5$ alkoxy, or a phenyl group optionally substituted with halide, $C_1$–$C_5$ alkyl, or $C_1$–$C_5$ alkoxy;
  X and $X^1$ are independently selected from hydrogen or an anionic ligand; and
  L and $L^1$ are any neutral electron donor.

6. The reinforced polyolefin article of claim 1 wherein:
  the compatible coupling agent includes chromium, silane, titanate, zirconate, zircoaluminate, or a hydroxyl terminated amphophilic coupling agent; and
  the coupling agent is optionally functionalized with at least one functional group, with the proviso that the compatible coupling agent is other than a functionalized silane having a primary amine functional group or a terminal epoxide functional group.

7. The reinforced polyolefin article of claim 6 wherein the functional group is other than a vinyl ether, an active oxygen functionality, acetylene, or a Lewis base that may adversely affect the catalyst.

8. The reinforced polyolefin article of claim 6 wherein the functional group is other than a thiol, a primary amine, a terminal epoxide, or a conjugated diene functionality.

9. The reinforced polyolefin article of claim 2 wherein the compatible coupling agent includes chromium or silane, with the proviso that the coupling agent is other than a functionalized silane having a primary amine group or a terminal epoxide group.

10. The reinforced polyolefin article of claims 1 or 5 wherein the compatible coupling agent includes a methacrylatochromic chloride complex.

11. The reinforced polyolefin article of claim 1 wherein the reinforcing material comprises fiberglass.

12. The reinforced polyolefin article of claim 11 wherein the fiberglass is a fiberglass fabric.

13. A method of making a polyolefin article incorporating a reinforcing material, the method comprising the steps of:
  a) at least partially coating the reinforcing material with a compatible coupling agent to form a sized reinforcement;
  b) admixing an olefin monomer polymerizable through metathesis polymerization with one of a ruthenium carbene complex catalyst or an osmium carbene complex catalyst to form a reaction mixture;
  c) introducing the reaction mixture into direct contact with the sized reinforcement to form a composite; and
  d) allowing the olefin monomer to undergo a metathesis polymerization reaction in the presence of the sized reinforcement such that the sized reinforcement is incorporated into the polyolefin article.

14. The method of claim 13 wherein the olefin monomer comprises a cyclic olefin.

15. The method of claim 13 wherein the cyclic olefin comprises dicyclopentadiene.

16. The method of claim 13 wherein the reinforcing material comprises fiberglass.

17. The method of claim 13 wherein the olefin monomer has a purity greater than about 95 percent by weight.

18. The method of claim 13 wherein the metathesis polymerization catalyst is of formula:

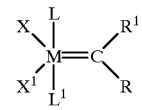

where:
  M is Os or Ru;
  R and $R^1$ are independently selected from hydrogen, or a substituent group selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, each substituent group optionally substituted with one or more groups selected from $C_1$–$C_5$ alkyl, halide, $C_1$–$C_5$ alkoxy, or a phenyl group optionally substituted with halide, $C_1$–$C_5$ alkyl, or $C_1$–$C_5$ alkoxy;

X and $X^1$ are independently selected from hydrogen or an anionic ligand; and

L and $L^1$ are any neutral electron donor.

19. The method of claim 14 wherein:

the compatible coupling agent includes chromium, silane, titanate, zirconate, zircoaluminate, or a hydroxyl terminated ampliophilic coupling agent; and the coupling agent is optionally functionalized with at least one functional group, with the proviso that the coupling agent is other than a functionalized silane having a primary amine group or a terminal epoxide group.

20. The method of claim 14 wherein the compatible coupling agent includes chromium or silane, with the proviso that the coupling agent is other than a functionalized silane having a primary amine group or a terminal epoxide group.

21. A method of making a reinforced polyolefin, the method comprises polymerizing a cyclic olefin monomer in the presence of:

a compatible coupling agent disposed on a reinforcing material, the coupling agent being other than a functionalized silane having a primary amine functional group or a terminal epoxide functional group, and a metathesis polymerization catalyst which includes ruthenium or osmium.

* * * * *